United States Patent [19]

Sasaki et al.

[11] Patent Number: 4,569,980

[45] Date of Patent: Feb. 11, 1986

[54] RELEASABLE FILM FORMING COMPOSITIONS

[75] Inventors: Shosaku Sasaki; Nobuo Kaiya, both of Ichihara, Japan

[73] Assignee: Toray Silicone Company, Limited, Tokyo, Japan

[21] Appl. No.: 589,092

[22] PCT Filed: Jun. 15, 1983

[86] PCT No.: PCT/JP83/00192

§ 371 Date: Feb. 15, 1984

§ 102(e) Date: Feb. 15, 1984

[87] PCT Pub. No.: WO84/00034

PCT Pub. Date: Jan. 5, 1984

[30] Foreign Application Priority Data

Jun. 15, 1982 [JP] Japan ............................. 57-102550
Jul. 1, 1983 [JP] Japan ............................. 58-805

[51] Int. Cl.$^4$ ............................. C08G 77/06
[52] U.S. Cl. ............................. 528/14; 524/861;
528/15; 528/18; 528/19; 528/31; 528/33;
528/34; 528/901
[58] Field of Search .................. 528/31, 33, 34, 901,
528/18, 14, 19, 15; 524/861

[56] References Cited

U.S. PATENT DOCUMENTS 3,127,363 3/1964 Nitzsche et al. .................. 524/861
4,176,093 11/1979 Zoch ................................. 524/404
4,461,851 7/1984 Hashimoto ........................ 528/15

*Primary Examiner*—Melvyn I. Marquis
*Attorney, Agent, or Firm*—Scully, Scott, Murphy & Presser

[57] ABSTRACT

The present invention provides a releasable film forming composition comprising (1) an organopolysiloxane having hydroxyl groups at the ends of the molecular chain, (2) a finely divided silica, (3) a phenyl-containing organosilane or organopolysiloxane, (4) an organohydrogenpolysiloxane containing at least three SiH groups per molecule, (5) a metallic salt of an organic acid and (6) an organic solvent, and a process for preparing same, as well as a releasable film forming composition comprising (1) an organopolysiloxane containing at least two silicon atom-bonded alkenyl groups per molecule, (2) a finely divided silica, (3) a phenyl-containing organosilane or organopolysiloxane, (4) an organohydrogenpolysiloxane containing at least two SiH groups per molecule, (5) a platinic compound and (6) an organic solvent, and a process for preparing same. These compositions exhibit a superior printability and a stable releasability from adhesive materials and are less slippery.

6 Claims, No Drawings

RELEASABLE FILM FORMING COMPOSITIONS

FIELD OF ART

The present invention relates to releasable film forming compositions. More particularly, it is concerned with releasable film forming compositions which exhibit a superior printability, a stable releasability from adhesive materials and a reduced slipperiness.

It has already been well known that condensation reaction type and addition reaction type curable organopolysiloxane compositions, when cured on the surface of base materials such as synthetic resin films, natural and synthetic fibers, glass cloth and aluminum, form a cured film and thereby impart to the base materials a releasability from adhesive materials. Those organopolysiloxane compositions have widely been used for labels, tapes, processing and wrapping papers.

However, those compositions are inferior in printability and very slippery although they are highly releasable. More particularly, in the case where an adhesive sheet or tape is manufactured using any of such organopolysiloxane compositions, drawbacks are encountered such as, for example, a poor printability of the surface coated with the organopolysiloxane composition, repellency against printing ink or felt pen ink (quick drying ink), and impossibility of printing or writing. In many cases, an adhesive sheet or tape is in a rolled form for convenience of its use, so the adhesive-applied layer on one side of a base material of the sheet or tape and the releasing layer formed on the opposite side of the base material of the sheet or tape and the releasing layer formed on the opposite side of the base material by a curable organopolysiloxane composition of the aforementioned type are in contact with each other in an overlapped manner. This is also true of the case where the organopolysiloxane composition is applied to a sheet or tape as a base material and overlaid with an adhesive. Such an adhesive sheet is in many cases printed before use. But, because of a poor printability of the releasing layer surface, it has heretofore been necessary to dispose a wood free paper or the like superior in printability between the adhesive layer and the back of the base sheet material. Moreover, in the case of using such adhesive tape for the packing of corrugated boards or the like, it has been impossible to write receiver's address, etc. on the tape. Further, corrugated boards after packing with such adhesive tape easily slip out of place because the tape surface is very slippery.

It is the object of the present invention to overcome the above-mentioned drawbacks of the prior art. More particularly, the object of the present invention is to provide releasable film forming compositions which exhibit a superior printability, a stable releasability from adhesive materials and a reduced slipperiness, and a process for preparing such compositions.

DISCLOSURE OF THE INVENTION

A first composition of the present invention is a releasable film forming composition comprising:

(1) 100 parts by weight of a substantially straight-chain organopolysiloxane having hydroxyl groups at the ends of the molecular chain and having a viscosity not lower than 1,000 centipoise at 25° C.;

(2) 5 to 80 parts by weight of a finely divided silica;

(3) 2 to 40 parts by weight of a phenyl-containing organosilane or organopolysiloxane represented by the general formula

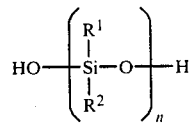

wherein $R^1$ and $R^2$ are each a monovalent hydrocarbon group, at least 25 mole % of $R^1$ and $R^2$ being phenyl, and n is a number of 1 to 100;

(4) 0.5 to 40 parts by weight of an organohydrogenpolysiloxane having at least three SiH groups per molecule;

(5) a catalytic amount of a metallic salt of an organic acid; and (6) a desired amount of an organic solvent.

A second composition of the present invention is a releasable film forming composition comprising:

(1) 100 parts by weight of a substantially straight-chain organopolysiloxane containing at least two silicon atom-bonded alkenyl groups per molecule and having a viscosity not lower than 1,000 centipoise at 25° C.;

(2) 5 to 80 parts by weight of a finely divided silica;

(3) 2 to 40 parts by weight of a phenyl-containing organosilane or organopolysiloxane represented by the general formula

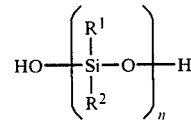

wherein $R^1$ and $R^2$ are each a monovalent hydrocarbon group, at least 25 mole % of $R^1$ and $R^2$ being phenyl, and n is a number of 1 to 100;

(4) 0.5 to 40 parts by weight of an organohydrogenpolysiloxane containing at least two SiH groups per molecule, provided the sum of the number of alkenyl groups per molecule of the component (1) and that of SiH groups per molecule of the component (4) is at least five;

(5) a catalytic amount of a platinic compound; and (6) a desired amount of an organic solvent.

The first and second releasable film forming compositions of the present invention are different in curing mechanism and consequently somewhat different in the components (1), (4) and (5). Main portion is common to both and exhibits common effects.

BEST FORM FOR PRACTISING THE INVENTION

The present invention will be described in detail hereinunder.

First, the components of the first composition of the invention will be explained one by one.

The substantially straight-chain organopolysiloxane as component (1) is represented by the following average unit formula $R_aSiO_{(4-a)/2}$ wherein a is a value of 1.95 to 2.05 and R is a substituted or unsubstituted monovalent hydrocarbon group such as, for example, methyl, ethyl, propyl, octyl, vinyl, allyl, phenyl, or 3,3,3-trifluoropropyl, at least 80 mol % of R being preferably methyl, and has a viscosity range at 25° C. from not lower than 1,000 cP up to a polymerizable gummy state and contains hydroxyl groups at the ends of the molecular chain. Hydroxyl group may be present also in the molecular chain in addition to the ends of the chain. The "substantially straight-chain" means a straight or partially branched chain. The component (1) may be a mixture of two or more thereof.

The finely divided silica as component (2) may be one prepared according to either of the dry and wet processes, and its particle size is not specially limited. However, in view of the printability exhibited when it is used together with the following component (3), it is desirable to use a wet process silica alone or both a wet silica and a dry process silica in combination. This finely divided silica is effective in improving the strength of a cured film and reducing the slipperiness in comparison with conventional organopolysiloxane compositions. But, with a mere addition of the component (2) alone, it would scarcely contribute to the improvement of printability. Only when it is used together with the following component (3), the printability can be improved to a remarkable extent.

The component (3) is a phenyl-containing organosilane or organopolysiloxane represented by the general formula

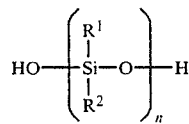

wherein $R^1$ and $R^2$ are each a monovalent hydrocarbon group such as, for example, methyl, ethyl, propyl, phenyl, vinyl, allyl, or 3,3,3-trifluoropropyl, at least 25 mol % of $R^1$ and $R^2$ being phenyl, and n is a number of 1 to 100. Examples are organosilanes such as diphenylsilanediol, methylphenylsilanediol, vinylphenylsilanediol and (3,3,3-trifluoropropyl)phenylsilanediol, α,ω-dihydroxy-diphenylpolysiloxane, α,ω-dihydroxymethylphenylpolysiloxane, organopolysiloxanes having hydroxyl groups at both ends of the molecular chain such as dimethylsiloxane-diphenylsiloxane copolymer, dimethylsiloxane-methylphenylsiloxane copolymer, dimethylsiloxane-methylphenylsiloxane-methylvinylsiloxane copolymer and dimethylsiloxane-methylphenylsiloxanemethyl(3,3,3-trifluoropropyl)siloxane copolymer.

A single use of the component (3) would not contribute to the improvement of printability, but when it is used together with the component (2), a remarkable improvement of printability which has been considered impossible in the use of conventional releasable organopolysiloxane compositions can be attained, that is, printing and writing can be done clearly without repelling printing ink or felt pen ink (quick drying ink). Further, without deterioration of the applicability to a base material and of the adhesive force of an adhesive there can be obtained a stable releasable film forming composition whose releasability does not change with the lapse of time. In order that these effects may be fully exhibited, it is necessary to use 5 to 80 parts by weight of the finely divided silica as component (2) and 2 to 40 parts by weight of the phenyl-containing organosilane or organopolysiloxane as component (3) both based on 100 parts by weight of the organopolysiloxane as component (1). If the amount of the component (2) is smaller than 5 parts by weight and that of the component (3) is smaller than 2 parts by weight, the effect of improving the printability will be reduced to half. This is because if the amount of the component (2) exceeds 80 parts by weight its kneading with the organopolysiloxane will become difficult and if the amount of the component (3) exceeds 40 parts by weight the applicability to a base material and the curability will be deteriorated. Further, if the phenyl content of the component (3) is less than 25 mol %, the effect of improving the printability will be deteriorated, that is, the object of the present invention will not be fully attained.

The organohydrogenpolysiloxane as component (4) which contains at least three SiH groups per molecule is a crosslinking agent for forming a cured film by condensation with the hydroxyl groups of the component (1). Typical examples are methylhydrogenpolysiloxanes such as, for example, tetramethyltetrahydrogencyclotetrasiloxane, methylhydrogenpolysiloxane, and methylhydrogensiloxane and dimethylsiloxane copolymer. But it is to be understood that these examples do not constitute any limitation. There also may be used organohydrogenpolysiloxanes which contain alkyl or phenyl group other than methyl. The degree of polymerization of the component (4) is in the range of from not lower than 2 up to a polymerizable level. The amount of the component (4) is usually in the range of 0.5 to 40 parts by weight based on 100 parts by weight of the component (1) in view of the formation of a cured film and the releasing performance.

The metallic salt of an organic acid as component (5) may be a conventional one used as catalyst for the condensation reaction of hydroxyl groups bonded to silicon atoms with hydrogen atoms bonded to silicon atoms. Examples of employable metals include tin, zinc, lead and iron. Concrete examples of the component (5) are dibutyltin diacetate, dibutyltin dioctoate, dibutyltin dilaurate, dioctyltin dilaurate, tin octoate, zinc naphthoate and iron octoate. The component (5) may be used in an amount sufficient to cure the composition. Its amount may be selected according to processing conditions, etc.

As the organic solvent of component (6) there may be used any organic solvent if only it can dissolve the organopolysiloxane of component (1). Examples are aromatic hydrocarbons such as benzene, toluene and xylene, aliphatic hydrocarbons such as heptane, hexane and pentane, halogenated hydrocarbons such as trichloroethylene and perchloroethylene, ethyl acetate and methyl ethyl ketone. The organic solvent is for diluting the composition so that the composition can be applied uniformly to a base material. Its amount is not specified because it varies largely, depending on the viscosity of the composition.

The first composition of the present invention explained above is obtained by merely uniformly mixing, dissolving and dispersing the components (1)–(6). The order of addition of the components is not specially limited. But, as the mixing method, it is preferable that the components (1), (2) and (3) be kneaded under heating in advance (or heated after kneading as the case may be) and then dissolved in the organic solvent together with the remaining components.

Next, the second composition of the present invention will be explained below.

The substantially straight-chain organopolysiloxane as component (1) is represented by the following average unit formula $RaSiO_{(4-a)/2}$ wherein a is a value of 1.95 to 2.05 and R is a substituted or unsubstituted monovalent hydrocarbon group such as, for example, methyl, ethyl, propyl, octyl, vinyl, allyl, phenyl, or 3,3,3-trifluoropropyl, at least 80 mol % of R being preferably methyl, and has at least two silicon atombonded alkenyl groups per molecule, vinyl group being a particularly preferred example of alkenyl, which alkenyl groups may be present only at the ends of the molecular chain or only in the molecular chain or at both, and has a viscosity range at 25° C. from not lower than 1,000 cP up to a polymerizable gummy state. Examples of the molecular chain end groups are trimethylsilyl, dimethylphenylsilyl, methyldiphenylsilyl, dimethylvinylsilyl, methylphenylvinylsilyl, hydroxyl and alkoxy groups. But it is to be understood that these examples do not constitute any limitation. The "substantially straight-chain" means a straight or partially branched chain. The component may be a mixture of two or more thereof.

The finely divided silica as component (2) is the same as in the first composition, and like the silica in the first composition, its has the effect of improving the strength of a cured film and reducing the slipperiness.

The phenyl-containing organosilane or organopolysiloxane as component (3) is also the same as in the first composition, and like the component (3) of the first composition, it has the effect of remarkably improving the printability. Other effects and the proportions of the components (1)-(3) are also the same as in the first composition.

The organohydrogenpolysiloxane as component (4) which contains at least two SiH groups per molecule is a crosslinking agent for forming a cured film by an addition reaction thereof with the component (1) under the catalytic action of the component (5). Typical examples are methylhydrogenpolysiloxanes such as, for example, tetramethyltetrahydrogencyclotetrasiloxane, methylhydrogenpolysiloxane, and methylhydrogensiloxanedimethylsiloxane copolymer. But it is to be understood that these examples do not constitute any limitation. There also may be used organohydrogenpolysiloxanes which contain alkyl or phenyl group other than methyl. The degree of polymerization of the component (4) is in the range of from not lower than 2 up to a polymerizable level. In order that a cured film may be formed by an addition reaction of alkenyl groups of the component (1) with SiH groups of the component (4), it is necessary that the sum of the number of alkenyl groups per molecule of the component (1) and that of SiH groups per molecule of the component (4) be at least five. The amount of the component (4) is usually in the range of 0.5 to 40 parts by weight based on 100 parts by weight of the component (1) in view of the formation of a cured film and the stripping performance.

The platinic compound as component (5) may be one usually employed in the addition reaction of alkenyl groups, especially vinyl groups, bonded to silicon atoms with hydrogen atoms bonded to silicon atoms. Examples are chloroplatinic acid, alcohol-modified chloroplatinic acid, platinum and olefin or vinylsiloxane complexes, fine particulate platinum adsorbed on a carrier such as alumina or silica, palladium and rhodium catalysts. Platinum compounds are preferred. The component (5) may be used in an amount sufficient to cure the composition. But, from the economic point of view and in order to obtain a good cured film, it is preferable that the amount of the component (5) be in the range of 1 to 1,000 ppm based on the amount of the component (1).

As the organic solvent of component (6) there may be used any organic solvent if only it can dissolve the organopolysiloxane of component (1). The same solvent as in the first composition may be used.

The second composition of the present invention explained above is obtained by merely uniformly mixing, dissolving and dispersing the components (1)-(6). But, as the mixing method, it is preferable that the components (1)-(3) be kneaded under heating in advance, or heated after kneading as the case may be, then dissolved in the organic solvent together with the component (4), and the component (5) be added just before use.

The releasable film forming compositions of the present invention thus obtained may be used directly or after further addition of other components such as, for example, an organopolysiloxane resin which is soluble in the organic solvent, a coloring matter, a pigment, an adhesion improver, a hydrocarbon-based polymeric substance and a curing reaction retarder. As a curing reaction retarder in the first composition there inevitably is used a condensation reaction retarder, e.g. acetic acid, because the curing reaction in the first composition is a condensation reaction. On the other hand, as a curing reaction retarder in the second composition there may be used an addition reaction retarder such as, for example, an organophosphorus compound, an organonitrogen compound, or an acetylene group-containing alcohol.

The releasable film forming compositions of the present invention can form a cured film in close contact with the surfaces of base materials such as, for example, various papers, synthetic resin films, fibers and aluminum. The cured film is very superior in printability for printing ink, felt pen ink, etc. which has not been attained by cured films of conventional releasable organopolysiloxane compositions. Further, the cured film obtained according to the present invention is advantageous in that since it is less slippery than conventional ones, even when release papers or the like coated with the compositions of the present invention are piled up, the papers are hard to slip out of place. On the other hand, against adhesive materials, such cured film affords a high residual adhesion percentage and provides an appropriate lightness in releasing and is very stable without undergoing a change in its releasability even with the lapse of time. Further, the releasability is not so greatly affected by the amount of the composition coated. Besides, since the compositions of the invention are superior in their applicability to base materials exemplified above, they may be used in smaller amounts. Additionally, in the case where it is necessary to print an adhesive sheet or tape, conventional adhesive sheets or tapes require a backing paper for the printing surface in addition to a release paper and an adhesive. On the other hand, an adhesive sheet or tape using a release paper coated with the composition of the present invention merely requires a combination of the release paper and an adhesive, that is, the backing paper can be omitted, thus leading to a remarkable reduction of cost.

Working examples of the present invention and comparative examples will be described below, in which the parts represent parts by weight and the values of viscosity are at 25° C. and in which the peeling resistance, residual adhesion percentage and printability were measured under the following conditions.

[Peeling Resistance]

A predetermined amount of an organopolysiloxane composition is applied to the surface of a sheet-like base material and then cured at a predetermined temperature for a predetermined period of time to form a cured film. Thereafter, an acrylic adhesive (Olibine BPS-5127, a product of Toyo Ink Mfg. Co., Ltd.) or a rubber adhesive (Olibine BPS-2411, a product of the same company) is applied to the surface of the cured film and heat-treated at 70° C. for 2 minutes. Then, a backing paper is applied to the adhesive, and a load of 20 g/cm² is put thereon and ageing is allowed to proceed for a predetermined period of time (one and sixty days in the working and comparative examples as will be described below). Sample after ageing is cut into 5cm width, then the backing paper is pulled at an angle of 180° and at a rate of 30 cm/min by means of a tension tester and the force (g) required for releasing is measured.

[Residual Adhesion Percentage]

A cured film is formed on the surface of a sheet-like base material in the same way as in the case of peeling resistance, and Nitto Polyester Tape 31B (a product of Nitto Electric Industrial Co., Ltd.) is applied to the surface of the cured film. Then, a load of 20 g/cm² is put on the tape, followed by heat treatment at 70° C. for 20 hours, then the tape is peeled off and applied to a stainless steel plate. The force (g) required for peeling the tape from the stainless steel plate at an angle of 180° and at a rate of 30 cm/min is measured and expressed as a percentage relative to the force (g) required for releasing an untreated standard tape from the stainless steel plate.

[Printability]

A cured film is formed on the surface of a sheet-like base material in the same way as in the case of peeling resistance, then words are written on the surface of the cured film with an oily quick drying ink, and whether the words can be written clearly or not is judged.

EXAMPLE 1

100 parts of α,ω-dihydroxy-dimethylpolysiloxane having a viscosity of 10,000 cP, 20 parts of a fumed silica (a dry process silica) having a specific surface area of 200 m²/g (measured according to the BET method) and 20 parts of a wet process silica having a D&A adsorption of 240 mgmol/Kg both as finely divided silica and 12 parts of diphenylsilanediol were kneaded under heating at 180° C. for 2 hours. To the resultant mixture were added 5 parts of methylhydrogenpolysiloxane both of whose molecular chain ends were blocked with trimethylsilyl groups and which had a viscosity of 20 cP, and then 2,983 parts of toluene, followed by mixing for dissolution and dispersion. Thereafter, 4 parts of dibutyltin diacetate was added and mixed thoroughly to obtain a composition.

Separately, as Comparative Example 1 there was prepared a composition under the same conditions as above except that 15 parts of α,ω-dihydroxydimethylpolysiloxane having an average degree of polymerization of 15 was used in place of 12 parts of diphenylsilanediol and the amount of toluene used was changed from 2,983 parts to 3,040 parts. As Comparative Example 2 there was prepared a composition under the same conditions as above except that the finely divided silica and the phenylsilanediol were not used and the amount of toluene used was changed to 1,995 parts. Further, as Comparative Example 3 there was prepared a composition under the same conditions as above except that the finely divided silica was not used and the amount of toluene used was changed to 2,223 parts.

The compositions thus prepared were measured for peeling resistance, residual adhesion resistance and printability according to the foregoing methods. For the measurement, the compositions were each applied to a polyethylene laminated kraft paper in an amount of 0.5 g/m² as solids content and heat-treated at 150° C. for 30 seconds to form a cured film. Further, for the measurement of peeling resistance, Olibine BPS-2411 (a product of Toyo Ink Mfg. Co., Ltd.) was used as an adhesive.

Table 1 below shows test results of the compositions prepared in the above working and comparative examples.

TABLE 1

| | Peeling resistance (g/5cm) | | Residual adhesion percentage (%) | Printability |
|---|---|---|---|---|
| | After 1 day | After 60 days | | |
| Example 1 | 95 | 94 | 96 | Good |
| Comparative Example 1 | 90 | 92 | 94 | Poor |
| Comparative Example 2 | 20 | 23 | 90 | Poor |
| Comparative Example 3 | 32 | 30 | 90 | Poor |

The composition obtained in Example 1 of the present invention proved to afford a very good printability permitting a uniform and clear writing of letters without repellence against felt pen ink. On the other hand, in the case of Comparative Examples 1-3, the repellency against felt pen ink was conspicuous and it was impossible to write letters clearly.

EXAMPLE 2

100 parts of a crude dimethylpolysiloxane rubber having hydroxyl groups at both ends, 30 parts of a wet process silica having a D&A adsorption of 240 mgmol/Kg as a finely divided silica and 15 parts of α,ω-dihydroxy-methylphenylpolysiloxane (phenyl group content: 50 mol %) having an average degree of polymerization of 10 were kneaded under heating at 180° C. for 2 hours. To the resultant mixture were added 8 parts of dimethylsiloxane-methylhydrogensiloxane copolymer both of whose molecular chain ends were blocked with trimethylsilyl groups and which had a viscosity of 6 cP, and 2,755 parts of toluene, followed by mixing for dissolution and dispersion. Thereafter, 6 parts of dibutyltin dioctoate was added and mixed to obtain a composition.

Separately, as Comparative Example 4 there was prepared a composition under the same conditions as above except that 15 parts of the α,ω-dihydroxydimethylpolysiloxane with an average polymerization degree of 15 used in Comparative Example 1 was used in place of 15 parts of the α,ω-dihydroxymethylphenylpolysiloxane (phenyl group content: 50 mol %). As Comparative Example 5 there was prepared a composition under the same conditions as above except that 15 parts of α,ω-dihydroxy-dimethylsiloxanemethylphenylsiloxane copolymer (phenyl group content: 5 mol %) having an average degree of polymerization of 20 was used in place of the α,ω-dihydroxymethylphenylpolysiloxane having a phenyl group content of 50 mol %. Further, as Comparative Example 6 there was prepared a composition under the same conditions as above except that the finely divided silica and the α,ω-dihydroxy-methylphenylpolysiloxane were not used and the amount of toluene used was changed to 2,052 parts.

The compositions thus prepared were each applied to a glassine paper in an amount of 0.9 g/m² as solids content and heat-treated at 160° C. for 30 seconds to form a cured film, which film was then measured for peeling resistance, residual adhesion percentage and printability. For the measurement of peeling resistance there was used Olibine BPS-5127 (a product of Toyo Ink Mfg. Co., Ltd.) as an adhesive.

Table 2 below shows results of the measurement. The composition obtained in Example 2 proved to afford a very good printability permitting a uniform and clear writing of letters without repellence against felt pen ink. Further, it exhibited a stable peeling resistance and the residual adhesion percentage was very high. On the other hand, in the case of Comparative Examples 4-6, the repellency against felt pen ink was conspicuous and the printability was very poor although the peeling resistance and the residual adhesion percentage were good. In the case of Comparative Example 5, an improvement of printability was recognized in comparison with Comparative Examples 4 and 5, but when compared with Example 2 the printability was still unsatisfactory for practical use.

TABLE 2

|  | Peeling resistance (g/5cm) | | Residual adhesion percentage (%) | Printability |
| --- | --- | --- | --- | --- |
|  | After 1 day | After 60 days | | |
| Example 2 | 73 | 75 | 96 | Good |
| Comparative Example 4 | 70 | 72 | 94 | Poor |
| Comparative Example 5 | 72 | 75 | 94 | Poor |
| Comparative Example 6 | 19 | 23 | 92 | Poor |

EXAMPLE 3

100 parts of a crude dimethylsiloxanemethylphenylsiloxane copolymer rubber (phenyl group content: 5 mol %) having hydroxyl groups at both ends, 10 parts of a fumed silica (a dry process silica) having a specific surface area of 300 m²/g (measured according to the BET method) and 50 parts of a wet process silica having a D&A adsorption of 240 mgmol/Kg both as finely divided silica and 20 parts of α,ω-dihydroxy-methylphenylsiloxane-diphenylsiloxane copolymer (phenyl group content: 75 mol %) having an average degree of polymerization of 20 were kneaded under heating at 180° C. for 2 hours. To the resultant mixture were added 12 parts of dimethylsiloxane-methylhydrogensiloxane copolymer both of whose molecular chain ends were blocked with trimethylsilyl groups and which had a viscosity of 100 cP, and 2,200 parts of toluene, followed by mixing for dissolution and dispersion. Thereafter, 6 parts of dibutyltin dilaurate was added and mixed to obtain a composition.

Separately, as Comparative Example 7 there was prepared a composition under the same conditions as above except that 20 parts of the α,ω-dihydroxy-dimethylpolysiloxane with an average polymerization degree of 15 used in Comparative Example 1 was used in place of the α,ω-dihydroxy-methylphenylsiloxanediphenylsiloxane copolymer (phenyl group content: 75 mol %). Further, as Comparative Example 8 there was prepared a composition under the same conditions as above except that the finely divided silica and the α,ω-dihydroxy-methylphenylsiloxanediphenylsiloxane copolymer having a phenyl group content of 75 mol % were not used and the amount of toluene was changed to 1,755 parts.

The compositions thus prepared were each applied to a polyethylene laminated kraft paper in an amount of 0.5 g/m² as solids content and heat-treated at 160° C. for 20 seconds to form a cured film, which film was then measured for peeling resistance, residual adhesion percentage and printability. For the measurement of peeling resistance, Olibine BPS-2411 (a product of Toyo Ink Mfg. Co., Ltd.) was used as an adhesive.

Table 3 below shows results of the measurement. The composition obtained in Example 3 proved to afford a very good printability permitting a uniform and clear writing of letters without repellence against felt pen ink. Further, it exhibited a stable peeling resistance and the residual adhesion percentage was very high. The composition obtained in Example 3 was allowed to stand for one day; as a result, it remained uniform without increase in viscosity. On the other hand, in the case of Comparative Examples 7 and 8, the repellency against felt pen ink was conspicuous and the printability was very poor. Moreover, a polyethylene laminated kraft paper coated with the composition of Comparative Example 8 was very slippery, while the paper coated with composition of Example 3 was hard to slip.

TABLE 3

|  | Peeling resistance (g/5cm) | | Residual adhesion percentage (%) | Printability |
| --- | --- | --- | --- | --- |
|  | After 1 day | After 60 days | | |
| Example 3 | 120 | 118 | 95 | Good |
| Comparative Example 7 | 113 | 115 | 93 | Poor |
| Comparative Example 8 | 25 | 29 | 91 | Poor |

EXAMPLE 4

100 parts of a crude dimethylsiloxanemethylvinylsiloxane copolymer rubber (vinyl group content: 0.2 mol %) having hydroxyl groups at both ends, 10 parts of a fumed silica (a dry process silica) having a specific surface area of 200 m²/g (measured according to the BET method) and 30 parts of a wet process silica having a D&A adsorption of 240 mgmol/Kg both as finely divided silica and 15 parts of dimethylsiloxane-methylvinylsiloxane-methylphenylsiloxane copolymer (vinyl group content: 5 mol %, phenyl group content: 30 mol %) having hydroxyl groups at both ends of the molecular chain and having an average degree of polymerization of 50 were kneaded under heating at 180° C. for 2 hours. To the resultant mixture were added 4 parts of methylhydrogenpolysiloxane both of whose molecular chain ends were blocked with trimethylsilyl groups and which had a viscosity of 20 cP, and 2,560 parts of toluene, followed by mixing for dissolution and dispersion. Thereafter, 7 parts of dibutyltin diacetate was added to obtain a composition.

The composition thus prepared was applied to a polyethylene laminated kraft paper in an amount of 0.7 g/m² as solids content and heat-treated at 140° C. for 20 seconds to form a cured film, which film was measured for peeling resistance and printability. For the measurement of peeling resistance, Olibine BPS-2411 (a product of Toyo Ink Mfg. Co., Ltd.) was used as an adhesive. Like Examples 1-3, the composition obtained in Example 4 proved to afford a very good printability without repellence against felt pen ink. Further, the peeling resistance was very stable, 88 g/5 cm after one day, 86 g/5 cm after 60 days.

EXAMPLE 5

100 parts of dimethylsiloxanemethylvinylsiloxane copolymer (vinyl group content: 2 mol %) having hydroxyl groups at the ends of the molecular chain and having a viscosity of 15,000 cP, 20 parts of a fumed silica (a dry process silica) having a specific surface area of 200 m$^2$/g (measured according to the BET method) and 20 parts of a wet process silica having a D&A adsorption of 240 mgmol/Kg both as finely divided silica and 13 parts of diphenylsilanediol were kneaded under heating at 180° C. for 2 hours. To the resultant mixture were added 5 parts of methylhydrogenpolysiloxane both of whose molecular chain ends were blocked with trimethylsilyl groups and which had a viscosity of 20 cP, and 2,100 parts of toluene, followed by mixing for dissolution and dispersion. Thereafter, a solution of chloroplatinate in isopropanol was added and mixed in an amount of 150 ppm as platinum based on the amount of the dimethylsiloxane and methylvinylsiloxane copolymer to obtain a composition.

Separately, as Comparative Example 9 there was prepared a composition under the same conditions as above except that 15 parts of α,ω-dihydroxy-dimethylpolysiloxane having an average degree of polymerization of 15 was used in place of 13 parts of diphenylsilanediol. As Comparative Example 10 there was prepared a composition under the same conditions as above except that the finely divided silica and the phenylsilanediol were not used and the amount of toluene used was changed to 1,400 parts. Further, as Comparative Example 11 there was prepared a composition under the same conditions as above except that the finely divided silica was not used and the amount of toluene used was changed to 1,400 parts.

The compositions thus prepared were measured for peeling resistance, residual adhesion percentage and printability. For the measurement, the compositions were each applied to a polyethylene laminated kraft paper in an amount of 0.5 g/m$^2$ as solids content and heat-treated at 150° C. for 20 seconds to form a cured film. For the measurement of peeling resistance, Olibine BPS-2411 (a product of Toyo Ink Mfg. Co., Ltd.) was used as an adhesive. Table 4 below shows test results of the compositions prepared in the above working and comparative examples.

TABLE 4

|  | Peeling resistance (g/5cm) | | Residual adhesion percentage (%) | Printability |
|---|---|---|---|---|
|  | After 1 day | After 60 days | | |
| Example 5 | 88 | 86 | 97 | Good |
| Comparative Example 9 | 86 | 84 | 95 | Poor |
| Comparative Example 10 | 26 | 25 | 96 | Poor |
| Comparative Example 11 | 35 | 40 | 85 | Poor |

The composition obtained in Example 5 of the present invention proved to afford a very good printability permitting a uniform and clear writing of letters without repellency against felt pen ink. The coated surfaces were hard to slip, and both the peeling resistance and the residual adhesion percentage were satisfactory. On the other hand, in the case of Comparative Examples 9-11, the repellency against felt pen ink was conspicuous and it was impossible to write letters clearly.

EXAMPLE 6

100 parts of a gummy dimetylsiloxane-methylvinylsiloxane copolymer (vinyl group content: 1.5 mol %) both of whose molecular chain ends were blocked with dimethylvinylsilyl groups, 30 parts of a wet process silica having a D&A adsorption of 240 mgmol/Kg as a finely divided silica and 15 parts of α,ω-dihydroxymethylphenylpolysiloxane (phenyl group content: 50 mol %) having an average degree of polymerization of 10 were kneaded under heating at 180° C. for 2 hours. To the resultant mixture were added 8 parts of dimethylsiloxane-methylhydrogensiloxane copolymer both of whose molecular chain ends were blocked with trimethylsilyl groups and which had a viscosity of 8 cP, 1,933 parts of toluene and 0.05 part of 3-methyl-1-butyne-3-ol as a reaction retarder, followed by a thorough mixing for dissolution and dispersion. Thereafter, a platinum-vinylsiloxane complex was added and thoroughly mixed in an amount of 100 ppm as platinum based on the amount of the gummy dimethylsiloxane-methylvinylsiloxane copolymer to obtain a composition.

Separately, as Comparative Example 12 there was prepared a composition under the same conditions as above except that 15 parts of α,ω-dihydroxydimethylpolysiloxane having an average degree of polymerization of 15 was used in place of 15 parts of the α,ω-dihydroxy-methylphenylpolysiloxane (phenyl group content: 50 mol %). As Comparative Example 13 there was prepared a composition under the same conditions as above except that 15 parts of α,ω-dihydroxy-dimethylsiloxane-methylphenylsiloxane copolymer (phenyl group content: 5 mol %) having an average degree of polymerization of 20 was used in place of the α,ω-dihydroxy-methylphenylpolysiloxane. Further, as Comparative Example 14 there was prepared a composition under the same conditions as above except that the finely divided silica and the α,ω-dihydroxy-methylphenylpolysiloxane were not used and the amount of toluene was changed to 1,439 parts.

The compositions thus prepared were each applied to a polyethylene laminated kraft paper in an amount of 0.7 g/m$^2$ as solids content and heat-treated at 140° C. for 20 seconds to form a cured film, which film was then measured for peeling resistance, residual adhesion percentage and printability. For the measurement of peeling resistance, Olibine BPS-5127 (a product of Toyo Ink Mfg., Co., Ltd.) was used as an adhesive. Table 5 below shows results of the measurement.

TABLE 5

|  | Peeling resistance (g/5cm) | | Residual adhesion percentage (%) | Printability |
|---|---|---|---|---|
|  | After 1 day | After 60 days | | |
| Example 6 | 80 | 81 | 97 | Good |
| Comparative Example 12 | 78 | 80 | 96 | Poor |
| Comparative Example 13 | 79 | 81 | 96 | Poor |
| Comparative | 22 | 24 | 94 | Poor |

TABLE 5-continued

|  | Peeling resistance (g/5cm) | | Residual adhesion percentage (%) | Printability |
| --- | --- | --- | --- | --- |
|  | After 1 day | After 60 days | | |
| Example 14 | | | | |

The composition obtained in Example 6 of the present invention proved to afford a very good printability permitting a uniform and clear writing of letters without repellence against felt pen ink. Further, it exhibited a stable peeling resistance, and the residual adhesion percentage was very high. On the other hand, in the case of Comparative Examples 12–14, the repellency against felt pen ink was conspicuous and the printability was very poor although the peeling resistance and the residual adhesion percentage were good. In the case of Comparative Example 13, an improvement of printability was recognized in comparison with Comparative Examples 12 and 14, but when compared with Example 6 the printability was still unsatisfactory for practical use.

EXAMPLE 7

100 parts of a gummy dimethylsiloxane-methylphenylsiloxane-methylvinylsiloxane copolymer (vinyl group content: 1.5 mol %, phenyl group content: 7 mol %) both of whose molecular chain ends were blocked with dimethylvinylsilyl groups, 40 parts of a fumed silica (a dry process silica) having a specific surface area of 130 $m^2/g$ (measured according to the BET method) as a finely divided silica and 15 parts of diphenylsilanediol were kneaded under heating at 180° C. for 2 hours. To the resultant mixture were added 3 parts of methylhydrogenpolysiloxane both of whose molecular chain ends were blocked with trimethylsilyl groups and which had a viscosity of 5 cP, 2,099 parts of toluene and 0.05 part of 3-methyl-1-butyne-3-ol as a reaction retarder, followed by a thorough mixing for dissolution and dispersion. Thereafter, a platinum-vinylsiloxane complex was added and thoroughly mixed in an amount of 120 ppm as platinum based on the amount of the gummy dimethylsiloxane-methylphenylsiloxane-methylvinylsiloxane copolymer to obtain a composition.

Separately, as Comparative Example 15 there was prepared a composition under the same conditions as above except that 20 parts of α,ω-dihydroxy-dimethylpolysiloxane having an average degree of polymerization of 15 was used in place of the diphenylsilanediol. Further, as Comparative Example 16 there was prepared a composition under the same conditions as above except that the finely divided silica and the diphenylsilanediol were not used and the amount of toluene used was changed to 1,368 parts.

The compositions thus prepared were each applied to a glassine paper in an amount of 0.9 g/$m^2$ as solids content and heat-treated at 150° C. for 20 seconds to form a cured film, which film was then measured for peeling resistance, residual adhesion percentage and printability. For the measurement of peeling resistance, Olibine BPS-5127 (a product of Toyo Ink Mfg. Co., Ltd.) was used as an adhesive. Table 6 below shows results of the measurement. The composition obtained in Example 7 of the present invention proved to afford a very good printability permitting a uniform and clear writing of letters without repellence against felt pen ink. Further, it exhibited a stable peeling resistance, and the residual adhesion percentage was very high. On the other hand, in the case of Comparative Examples 15 and 16, the repellence against felt pen ink was conspicuous and the printability was very poor. Moreover, a glassine paper coated with the composition of Comparative Example 16 was very slippery, while the paper coated with the composition prepared in Example 7 of the present invention was hard to slip.

TABLE 6

|  | Peeling resistance (g/5cm) | | Residual adhesion percentage (%) | Printability |
| --- | --- | --- | --- | --- |
|  | After 1 day | After 60 days | | |
| Example 7 | 89 | 88 | 97 | Good |
| Comparative Example 15 | 93 | 95 | 95 | Poor |
| Comparative Example 16 | 27 | 29 | 95 | Poor |

EXAMPLE 8

100 parts of a gummy dimethylsiloxane-methylvinylsiloxane copolymer (vinyl group content: 2 mol %) both of whose molecular chain ends were blocked with trimethylsilyl groups, 20 parts of a fumed silica (a dry process silica) having a specific surface area of 130 $m^2/g$ (measured according to the BET method) and 40 parts a wet process silica having a D&A adsorption of 240 mgmol/Kg both as finely divided silica and 25 parts of dimethylsiloxane-methylvinylsiloxane-methylphenylsiloxane copolymer (vinyl group content: 5 mol %, phenyl group content: 30 mol %) having hydroxyl groups at both ends of the molecular chain and having an average degree of polymerization of 50 were kneaded under heating at 180° C. for 2 hours. To the resultant mixture were added 15 parts of methylhydrogenpolysiloxane both of whose molecular chain ends were blocked with trimethylsilyl groups and which had a viscosity of 20 cP, 3,800 parts of toluene and 0.05 part of vinylmethyltetracyclosiloxane as a reaction retarder, followed by a thorough mixing for dissolution and dispersion. Thereafter, a platinum-vinylsiloxane complex was added and thoroughly mixed in an amount of 150 ppm as platinum based on the amount of the gummy dimethylsiloxane-methylvinylsiloxane copolymer to obtain a composition.

Separately, as Comparative Example 17 there was prepared a composition under the same conditions as above except that 25 parts of α,ω-dihydroxy-dimethylpolysiloxane having an average degree of polymerization of 15 was used in place of 25 parts of the dimethylsiloxane-methylvinylsiloxane-methylphenylsiloxane copolymer (vinyl group content: 5 mol %, phenyl group content: 30 mol %) having hydroxyl groups at both ends of the molecular chain.

The compositions thus prepared were each applied to a polyethylene laminated kraft paper in an amount of 0.6 g/$m^2$ as solids content and heat-treated at 140° C. for 15 seconds to form a cured film, which film was then measured for peeling resistance, residual adhesion percentage and printability. For the measurement of peeling resistance, Olibine BPS-2411 (a product of Toyo Ink Mfg. Co., Ltd.) was used as an adhesive. Table 7 below shows results of the measurement. The composition obtained in Example 8 of the present invention proved to afford a very good printability permitting a uniform and clear writing of letters without repellence against felt pen ink. Further, it exhibited a moderate peelability and a stable peeling resistance. Besides, it was possible to make dual coatings. The residual adhesion percentage was also very high. On the other hand, in the case of the composition of Comparative Example 17, the repellence against felt pen ink was conspicuous and the printability was very poor although its peeling resistance was stable, and it was not suitable for practical use.

TABLE 8

| | Peeling resistance (g/5 cm) | | Residual adhesion percentage (%) | Printability |
|---|---|---|---|---|
| | After 1 day | After 60 days | | |
| Example 8 | 98 | 100 | 99 | Good |
| Comparative Example 17 | 85 | 86 | 95 | Poor |

INDUSTRIAL UTILIZABILITY

The coated film obtained from the compositions of the present invention exhibit a superior printability and a stable peelability from adhesive materials and are free from silicone movement and superior in residual adhesion, and so the compositions are widely utilizable for adhesive sheets and tapes.

What is claimed is:
1. A releasable film forming composition comprising:
   (1) 100 parts by weight of a substantially straight-chain organopolysiloxane having hydroxyl groups at the ends of the molecular chain and having a viscosity not lower than 1,000 centipoise at 25° C., at least 80 mol % of the organic groups being methyl;
   (2) 5 to 80 parts by weight of a finely divided silica;
   (3) 2 to 40 parts by weight of a phenyl-containing organosilane or organopolysiloxane represented by the general formula

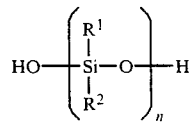

wherein $R^1$ and $R^2$ are each a monovalent hydrocarbon group, at least 25 mol % of $R^1$ and $R^2$ being phenyl, and n is a number of 1 to 100;
   (4) 0.5 to 40 parts by weight of an organohydrogenpolysiloxane having at least three SiH groups per molecule;
   (5) a catalytic amount of a metal salt of an organic acid in which the metal is selected from the group consisting of tin, zinc, lead and iron; and
   (6) an amount of an organic solvent sufficient to dissolve component (1).
2. The composition of claim 1 wherein said finely divided silica as component (2) is a wet process silica.
3. The composition of claim 1 wherein said finely divided silica as component (2) is a mixture of a wet process silica and a dry process silica.
4. A process for preparing a releasable film forming composition, which process comprises kneading under heating (1) 100 parts by weight of a substantially straight-chain organosiloxane having hydroxyl groups at the ends of the molecular chain and having a viscosity not lower than 1,000 centipoise at 25° C., at least 80 mol % of the organic groups being methyl, (2) 5 to 80 parts by weight of a finely divided silica and (3) 2 to 40 parts by weight of a phenyl-containing organosilane or organopolysiloxane represented by the general formula

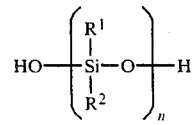

wherein $R^1$ and $R^2$ are each a monovalent hydrocarbon group, at least 25 mol % of $R^1$ and $R^2$ being phenyl, and n is a number of 1 to 100, and then dissolving the resulting mixture in an amount of an organic solvent sufficient to dissolve component (1) together with (4) 0.5 to 40 parts by weight of an organohydrogenpolysiloxane having at least three SiH groups per molecule and (5) a catalytic amount of a metal salt of an organic acid in which the metal is selected from the group consisting of tin, zinc, lead and iron.
5. The composition of claim 1 wherein the metal is tin.
6. The process of claim 4 wherein the metal is tin.

* * * * *